Feb. 25, 1969     W. J. PEARSON ET AL     3,429,168
ROD BENDING METHOD AND APPARATUS
Filed April 11, 1967     Sheet _1_ of 4
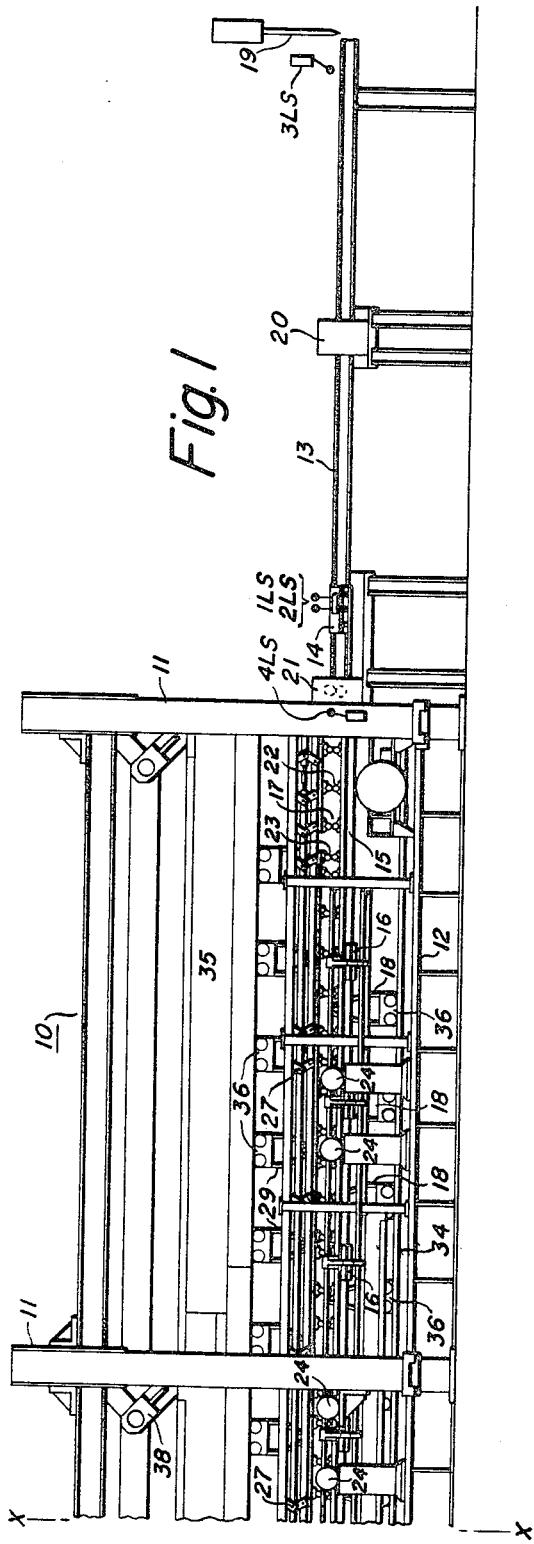
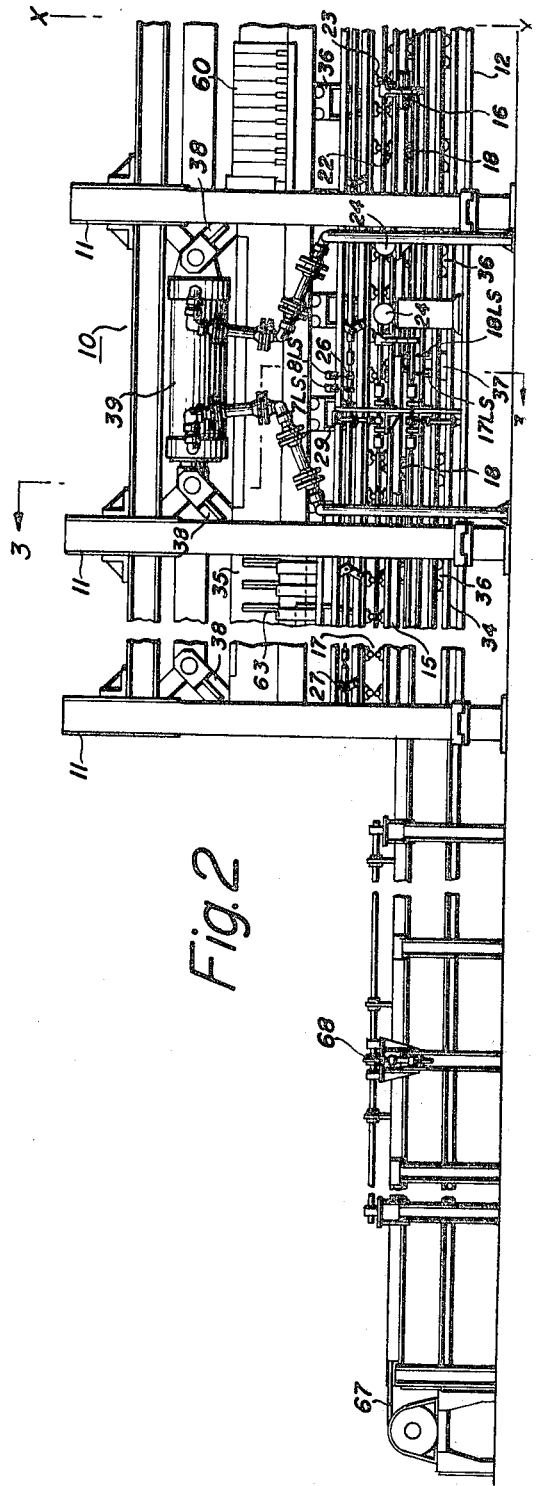
INVENTORS
William J. Pearson
Charles R. Nippert Sr.

INVENTORS
William J. Pearson
Charles R. Nippert Sr.

INVENTORS
William J. Pearson
Charles R. Nippert Sr.

United States Patent Office 3,429,168
Patented Feb. 25, 1969

3,429,168
ROD BENDING METHOD AND APPARATUS
William J. Pearson, Bethlehem, and Charles R. Nippert, Sr., Allentown, Pa., assignors to Bethlehem Steel Corporation, a corporation of Delaware
Filed Apr. 11, 1967, Ser. No. 629,971
U.S. Cl. 72—296       5 Claims
Int. Cl. B21d 11/04, 31/00

ABSTRACT OF THE DISCLOSURE

An apparatus for simultaneously effecting a plurality of bends in a rod to form a zig-zag member for use as the web section of an open-web joist structure, including means for either manual or fully automatic operation. A method of producing the zig-zag members including feeding, bending, and ejecting the workpiece in which the member produced is dimensionally accurate regardless of the resilience of the material used.

Background of the invention

This invention relates to rod bending apparatus and more particularly to an improved machine for automatically effecting the simultaneous bending of rods into a plurality of V-shape panels to form the zig-zag web section of open-web joist structures and the like.

In the fabrication of welded open-web steel joists a zig-zag web element comprising a rod bent into a plurality of V-shape panels is welded to top and bottom chord members, e.g., structural angles. It is essential, particularly in view of today's high production and increased quality demands, that these web elements be formed accurately, economically and rapidly. A precision bent web is essential to the automatic fabricating methods used. Some of the inaccuracies in the web element that are intolerable to current fabrication methods are variable panel heights, variable pitch lengths, spiral twist and unequal leg lengths.

Heretofore, the zig-zag web element has been bent either on machines capable of bending only one panel of the web element at a time or on machines adapted to make a plurality of bends in a rod simultaneously but lacking means for making positive and accurate bends regardless of the resilience of the rod being bent. Rapid shifting from the production of one size to another is also important. Automatic equipment for the production of zig-zag web elements for use in certain structural members, forming precision bends at a rapid rate is unknown.

Summary of the invention

The present invention provides an improved, automatic machine for simultaneously bending a plurality of accurate, uniform V-shape panels in one or more rods to produce precision bent zig-zag web members at a high rate of production.

It is, therefore, an object of this invention to provide a rod bending machine which is capable of making a plurality of bends in one or more rods simultaneously in a manner that will insure accurate dimensional properties in the resulting web manner.

It is another object of this invention to provide means whereby a plurality of bends is formed simultaneously in one or more rods in an easy and natural manner without deforming or fracturing the rods at the point of bend or creating torsional or other stresses therein.

It is a further object of this invention to provide fully automatic means for feeding rods into a rod bending machine, bending the rods as heretofore described and ejecting the bent rods from the machine.

It is a still further object of this invention to provide a rod bending machine whcih is adapted to bend rods of widely varying sizes and lengths.

Other and further objects of the invention will be apparent to those skilled in the art from the following detailed description of the annexed sheets of drawings in which, by way of a preferred example only, one embodiment of the invention is illustrated.

Brief description of the drawings

Referring to the drawings:

FIGURES 1 and 2 combine at match line X—X to form a broken front elevational view of the machine;

Description of the preferred embodiment

Figure 3:
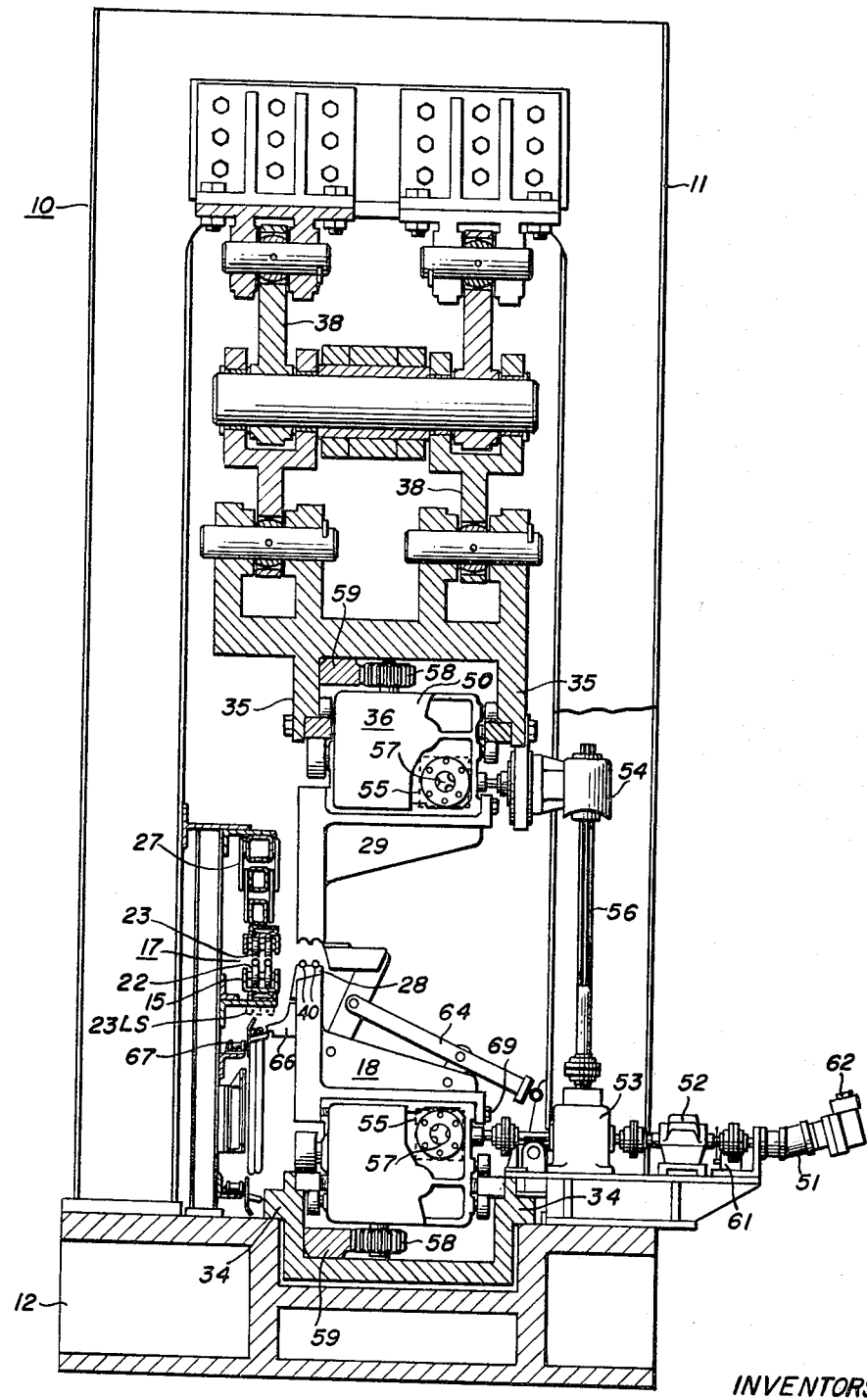
FIGURE 3 is a sectional view on an enlarged scale, through the machine, taken on line 3—3 of FIGURE 2.

It will be appreciated that many of the component elements of the rod bending machine are not illustrated in the drawings, their disclosure being unnecessary for an understanding of the present invention.

Referring to the drawings:

The rod bending machine of the instant invention comprises three separate and distinct operations which are interlocked and overlapped to effect the time saving feature of the machine. The three operations include rod feeding, bending cycle and web ejection. Referring to FIGS. 1 and 2 the rod bending machine 10 is seen to be supported within several spaced apart support frames 11 resting on base 12. The bending machine frame is dimensionally symmetrical about the center line of the machine as viewed in FIGS. 1 and 2.

Rod feeding

The rod feeding operation comprises generally an approach table 13, a shuttle assembly 14 to direct rods to either of two tracks on the receiver table 15, (FIG. 3) and a plurality of fingers 16 adapted to lift the rods from the receiver table rolls 17 and deposit them on the bottom die blocks 18. A shear 19 located adjacent to the approach table 13 cuts the previously straightened rod to the required length necessary to produce a zig-zag web member of the desired dimensions. An auxiliary feed roll 20 activated by limit switch 3LS accelerates the rod along the rollers of the approach table 13 into the shuttle mechanism 14. Limit switches 1LS and 2LS control the position of the shuttle guide 14 to direct the rods into the proper track on the receiver table 15. A signal from limit switch 4LS that the rod has passed accelerating rolls 21 shifts the shuttle guide 14 to the opposite side and the next rod will enter the other track. The receiver table 15 comprises a plurality of receiver rolls 17, a lower set 22 mounted on a fixed support opposed by an upper set 23 which is retractable from said first set. The receiver rolls 17 are grooved to receive and guide two rods between the upper and lower sets when the upper set 23 is extended toward the lower set 22 to engage the rods therebetween. Receiver drive rolls 24 are provided to advance the rods along the receiver table 15 to a buffer stop 25. Limit switches 5LS and 6LS signal the presence of a rod at the buffer on each of the tracks respectively and the receiver drive rolls 24 are stopped, the rods having reached the preset buffer 25 which positions the rod properly relative to the bending machine. The receiver upper roll section 23 is retracted by actuation of hydraulic cylinder 26 which is connected to a toggle link arrangement 27 from which said upper roll section 23 depends. The position of the upper roll section 23 is signalled by the limit switch 7LS for the retracted (up) position and 8LS for the extended (down) position.

A plurality of rod lifting and transfer fingers 16 are provided in spaced relation along the receiver table, FIGS. 1 and 2, adapted to lift the rods off the receiver table and transfer them to and deposit them on the bottom bending dies 18. The fingers 16 are designed with trough-like depressions to firmly engage the rods at several spaced apart points along their full length. This is necessary so that the proper center line alignment is maintained regardless of the inaccuracies in straightness of the rod.

The rods are deposited on the bottom bending dies 18 which are provided with work engaging dies 28 removably attached to said bending dies. The work engaging dies are grooved slightly to form a saddle for each bar. The top die blocks 29, which also are provided with grooved work engaging dies, are made to descend until they rest on the rods thus firmly engaging the rods between the top and bottom dies. The rods are thus seen to be under complete control at all times prior to the start of the bending cycle to assure accurate precision bending of the rods regardless of the straightness of the rods. The rod transfer fingers 16 are then lowered away from the rods, now resting on the bottom bending dies, and return to their original position at the receiver table 15, where the operation of replenishing the rods on the receiver table has begun.

Figure 4:
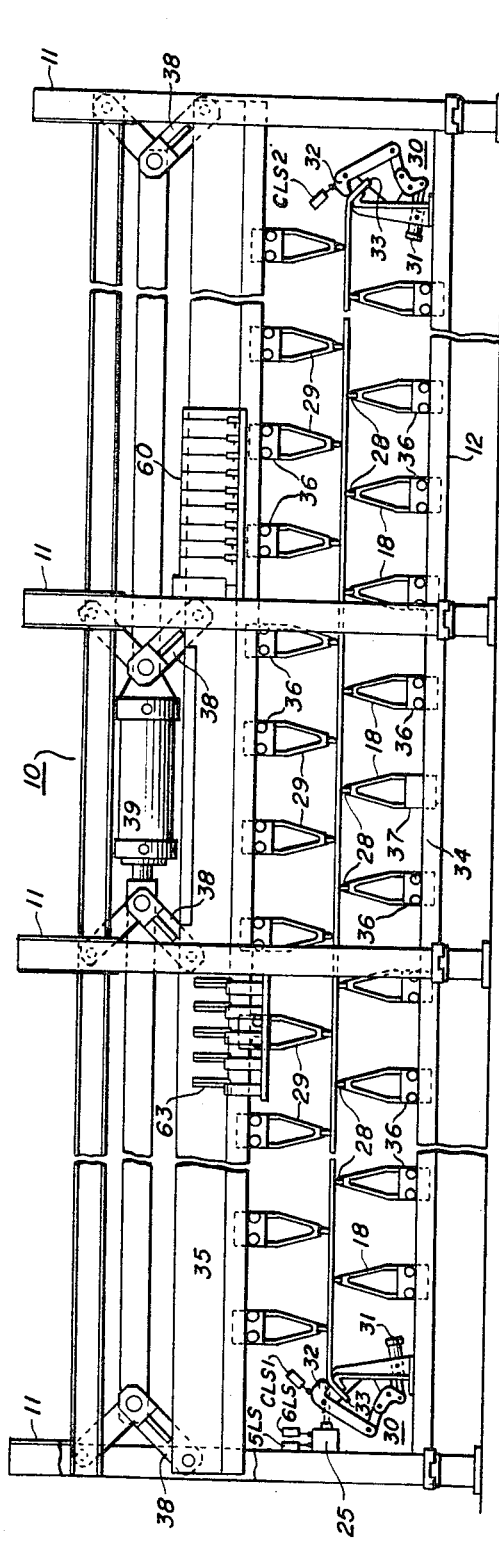
FIGURE 4 is a longitudinal view of the bending area of the machine with certain elements omitted for purposes of clarity.

FIGURE 3 clearly shows the rods resting on the bottom dies 18 with the top die blocks 29 in the withdrawn position prior to the start of the bending cycle. In FIG. 4 it is seen that end clamping carriages 30 grip the ends of the rods by action of hydraulic cylinder 31 which also activates limit switches CLS1 and CLS2 to indicate the completion of the clamping. The action of gripper dies 32 during the end clamping operation also forms the end turndowns 33 on the rods. The clamping carriages 30 comprise gripper dies 32 mounted on movable carriages which are positioned on one of a pair of guide members. Clamping carriages 30 are adapted to move longitudinally toward each other on said guide member.

Rod bending cycle

The bending cycle proceeds from the position of the rods firmly engaged between the top and bottom die blocks, as seen in FIG. 4. The bending apparatus comprises first 34 and second 35 opposed guide members having a plurality of movable die carriages 36 mounted thereon. A fixed die carriage 37 is centrally positioned on one of the guide members. In the pictured embodiment the fixed die carriage 37 is located at the center of the first or bottom guide member 34 though it should be understood that said fixed die carriage 37 would function equally as well on the second or top guide member 35. The bottom guide member 34 is fixed to and becomes a part of the base 12 and the top guide member 35 depends from a toggle link apparatus 38 supported from support frames 11. The die carriages on one of the guide members are positioned opposite the spaces between the die carriages on the other guide member.

The top disc will descend simultaneously with the closing up of the top and bottom die carriages toward the center or fixed die 37. Power means for driving the top guide member 35 toward the bottom guide member 34 comprises a double acting hydraulic cylinder 39 which is connected to the toggle link apparatus 38 from which the top guide member 35 depends, as seen in FIGS. 2 and 4.

The double acting main cylinder 39 is of well known standard construction and extends when hydraulic pressure is applied to the head end applying equal force on toggle links 38 at both sides of the press causing the top guide member 35 to descend. After completing its stroke, pressure is applied to the rod end of the cylinder to open toggle links 38 which raise the top guide member 35.

The hydraulic service to moving portions is provided with available commercial components such as swivel joints, as shown in FIG. 2, or flexible hose.

Referring once again to FIG. 3 it is seen that a gear ratio establishing unit 50 is an integral part of each die carriage 36 and is adapted to drive the die carriages 36 longitudinally on their respective guide members thus controlling the relative speed of each die carriage. Carriage motion, i.e. gathering, of the die carriages 36 is accomplished by a drive unit 51, e.g., a hydraulic motor, driving through gear reduction units 52, 53, 54 and 55. Power transmission between the gear reduction units is through spline shafts 56 and 57. Power is transmitted through spline shafts 57 to the gear ratio establishing unit 50 of each carriage, each with a gear ratio unlike that of the adjacent unit, to drive pinion 58 on common racks 59 mounted on each of the guide members 34 and 35. The die carriages 36 thus move at different speeds as the bending cycle progresses, the speed being proportionately greater for the die carriages positioned outwardly from the center of the machine thereby maintaining equidistant spacing between the panel points of the web member.

The gathering speed of the die carriages 36 is controlled by a battery of servo command pots 60. The motion of the top guide member 35 is controlled by a feedback pot 61 and servo valve 62 on the hydraulic motor drive unit 51, synchronizing the motions of the descent of the top guide member 35 and the gathering speed of the die carriages 36.

Figure 6:
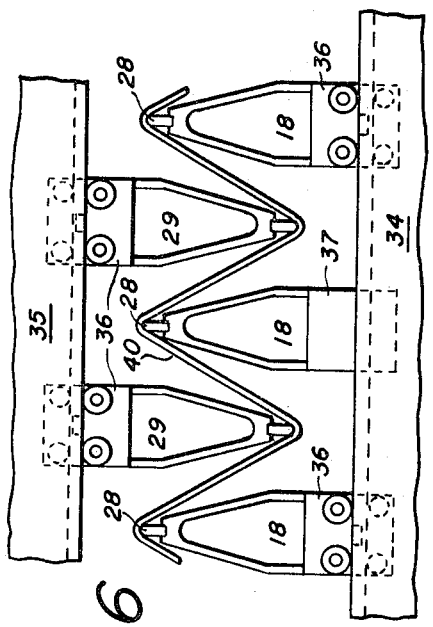
FIGURE 6 is a fragmentary view similar to FIGURE 5 with the bending cycle completed.
Figure 5:
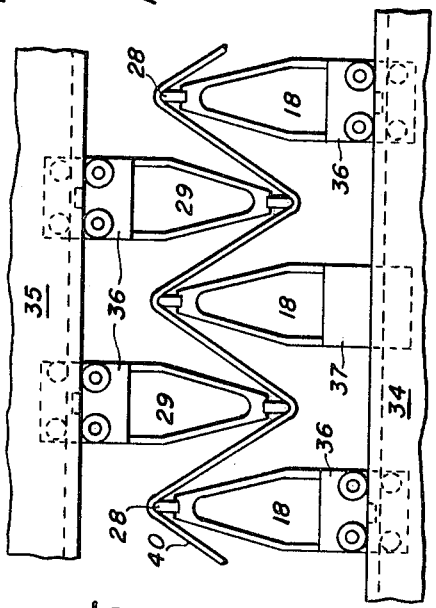
FIGURE 5 is a fragmentary view of a portion of the bending die carriages with the bending cycle in progress.

A first automatic means which comprises limit switch 17LS signals the limit of inward longitudinal movement of the die carriages 36 on the guide members. The drive 51 is automatically stopped with the work engaging dies 28 positioned at the desired pitch distance apart and all dies equispaced as seen in FIG. 5. A second automatic means is provided to permit continued limited downward movement of the top guide member 35 with the bent bar tightly clamped between the die carriages resulting in a slight stretching of the legs of the webs beyond the elastic limit of the metal bar. The V-shape panels of the zig-zag web members are thus fixed, accurately establishing the desired pitch distance and depth of section and further, avoiding twisting of the panel points. FIGURE 6 illustrates the final position of the bent zig-zag web member in the bending cycle. The second automatic means comprises a ram control limit switch, preset for the particular desired web section, located in a battery of ram control limit switches 63 which emits a signal reversing the downward travel of the top guide member 35 and retracting it to its starting position. Web ejectors 64, FIG. 3, are then automatically activated and the bent bar is ejected. The carriage motion is activated to withdraw the die carriages 36 to their starting positions. Limit switch 18LS controls the outward movement of the carriages on their guide members. The bending cycle is ready to repeat at this point.

The great flexibility of this machine will be obvious to those skilled in the art. For instance, short web sections can be bent using only one half of the machine with one clamped end stationary and the other clamped end following a longitudinal path toward the stationary end as the bending progresses. The centrally located fixed die carriage 37 must be within a web section. The clamping dies can be placed on any bending carriage depending on the number of panels required in the web section. Further, because of the extremely long pieces which can be handled in this machine, it is possible and advantageous to form a single web section, in one operation of the machine, from which many shorter sections of the same depth and pitch length may be cut.

Rod ejecting operation

The bent rods resting on the bottom dies at the end of the bending cycle are ejected therefrom by means of a plurality of ejector arms 64 spaced along the length of the machine in the bending area. Referring to FIG. 3, the bent rods 40 are pushed off the bottom dies by means of a hydraulic cylinder (not shown) which is actuated to project the ejector arms 64 forward against the rods 40. The hydraulic cylinder is controlled by means of limit switches. The ejected bent bars slide down guides 66 where they engage limit switch 23LS which activates a chain conveyor 67 which carries the bent bars, on pins attached thereto, clear of the bender frames whereupon the conveyor is stopped. The bars are then ejected from the exit conveyor 67 by means of ejector arms 68 and deposited on a transfer skid (not shown).

Figure 7:
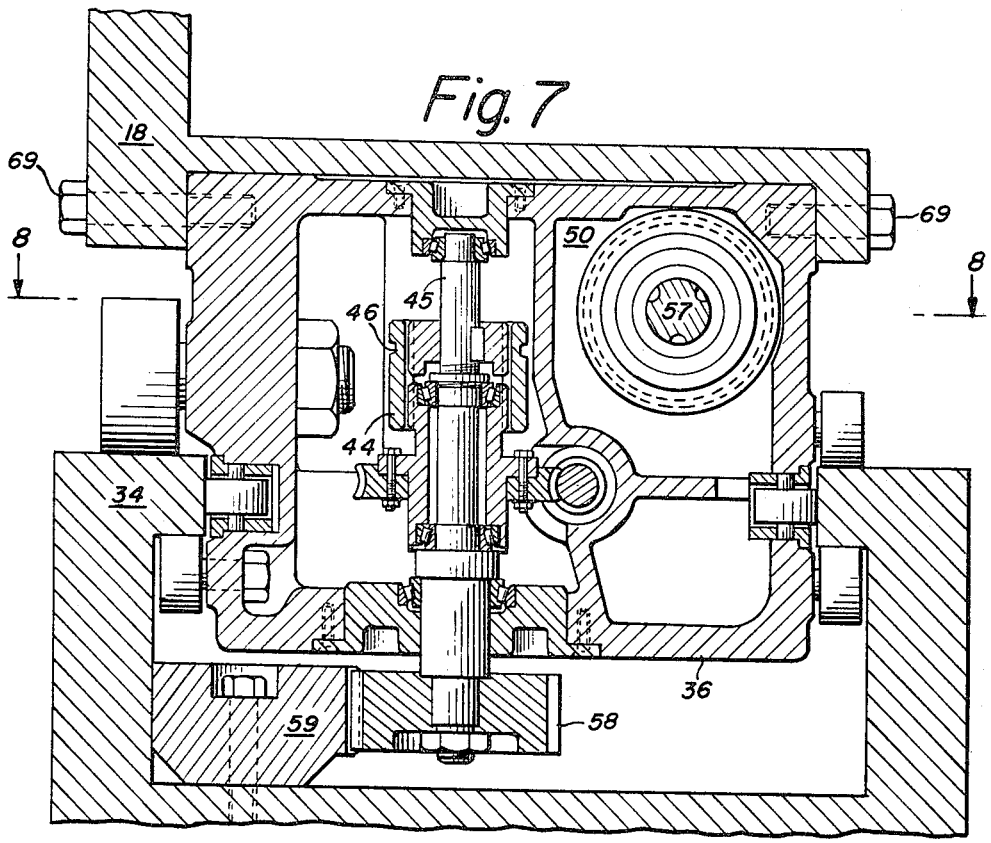
FIGURE 7 is an enlarged sectional view of a bottom carriage.
Figure 8:
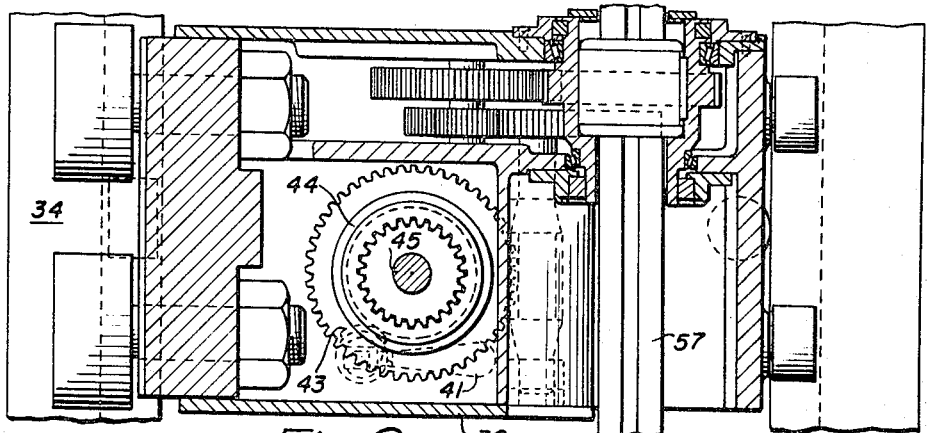
FIGURE 8 is a sectional view of the carriage of FIGURE 7 taken on line 8—8.

FIGS. 7 and 8 show a detailed section of the die carriage 36 with the integral gear ratio establishing unit 50 exposed. The die carriage shown is mounted on the bottom guide member 34. Bottom die block 18 is removably attached to the die carriage by bolts 69. The work engaging die 28 is removably attached to the opposite end of the die block 18 as e.g., by bolts (see FIG. 3). The pinion 58 is driven along the common rack 59 by means of power delivered to it from spline shaft 57 through a system of worms and gears in the gear ratio establishing unit 50 which will be readily understood by those skilled in the art.

Figure 9:
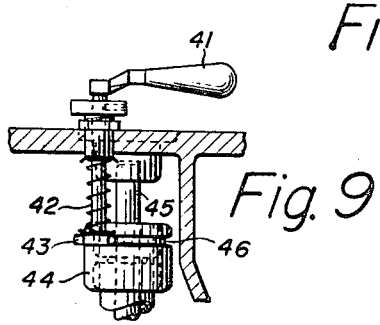
FIGURE 9 is a fragmentary view of the carriage showing the clutch device for selectively activating the carriage with the clutch engaged.
Figure 10:
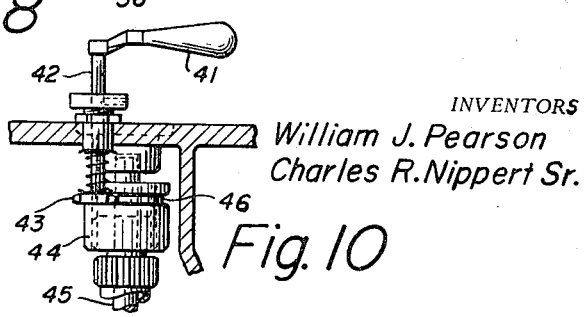
FIGURE 10 is a view similar to FIGURE 9 in which the clutch is disengaged.

FIGS. 9 and 10 are fragmentary views of a portion of the die carriage showing a clutch device for selectively activating or deactivating carriages. Clutch handle 41 and clutch cam 43 are fixed on opposite ends of clutch lever shaft 42. The operator turns handle 41 and lifts shaft 42 whereupon the clutch cam 43, engaging annular groove 46 in clutch hub 44, lifts the clutch hub vertically along the splined output shaft 45 to disengage the hub 44 from said shaft 45 thus disengaging carriage 36 from the gear train. The handle 41 is adapted to be locked in either the in or out position of the clutch.

The disengagement of selected carriages is necessary in order to form webs with different numbers of V-shaped panels and also to prevent undue wear of the associated machine elements. The clutch accomplishes this by disengaging the drive unit 50 from the pinion 58, thus dropping the corresponding die carriage from the power train.

In operation

The operator initiates the feeding of a continuous strand of rod from a supply coil of rod into a straightener and selects a sequencing control switch for the desired web section to be bent. The rod 40 is fed onto approach table 13 and cut to the required length at shear 19. The operation of the shear activates limit switch 3LS which causes the auxiliary feed rolls 20 and accelerator rolls 21 to operate to feed the cut rods into shuttle 14 where the rods are fed into one side or the other of the two-track receiver table 15. The grooved rolls of the top and bottom sets of receiver table rolls form a guide for the rods to a buffer stop. Contact of the rods with limit switches at the buffer stop withdraws the upper set of receiver table rolls 23 and starts the operation of the rod lifting and transfer fingers 16. The transfer fingers lift the rods 40 from the bottom receiver rolls 22 and deposit them on the bottom die blocks 18 whereupon the top guide member 35 descends to a position in which the top die blocks 29 contact the rods 40 resting on the bottom die blocks 18 to insure perfect alignment of the rods 40 prior to bending. The gripper dies 32 on the end clamping carriages 30 are activated to clamp the ends and form the end turndowns 33 on the rods 40. The rod lifting and transfer fingers 16 are then withdrawn returning to their starting position to be ready to transfer the next bars into the bending machine. Limit switches mounted on the clamping carriages signal the completion of the clamping and start the bending cycle. The drive unit 51 is activated simultaneously with the renewed downward stroke of the top guide member 35. The carriages 36 have been preset on their respective guide members to establish the required pitch distance between panel points and the gear ratio of each carriage gear ratio establishing unit 50 maintains equidistant spacing between the carriages as the ends of the rods 40 follow a longitudinal path toward each other while simultaneously bending a plurality of V-shape panels intermediate the ends. When the carriages have traveled the required distance to establish the pitch length between panel points a limit switch deactivates the drive unit 51 to stop further longitudinal movement of the carriages. The downward movement of the top guide member 35 continues for a short distance depending on the size of the rod and the required depth of section to stretch the panels. The downward movement is controlled by the selection of a limit switch control, from a battery of controls, for the particular desired web section. When the required depth of section is attained according to the control limit switch selected the top guide member 35 is retracted completely and the bent rods are ejected from the machine onto a conveyor 67 which carries the web sections out of the bending area to a transfer skid. The carriages are returned to their starting positions on the ejection of the bars from the bender and recycling is begun.

It is therefore readily seen that it is both practical and economical to automatically bend rods into a plurality of V-shaped panels to form a continuous zig-zag element for use in the manufacture of structural members with precision and speed heretofore unknown. This invention describes a method for bending rods simultaneously at a plurality of points intermediate the ends, the ends following a longitudinal path toward each other as the bending progresses. The method further provides for limiting further longitudinal movement of the V-shape panels when the desired pitch is attained while stretching the panels to insure accurate dimensional properties of the bent web section.

Furthermore all operations are so synchronized that the bars are fed into and out of the bending area of the machine while the bender operates so that minimum operating time is consumed. The machine can be operated either fully automatic or manually as desired. The instant invention provides means for bending bars wherein the metal is so worked in the process of forming that the resultant product is stabilized as to shape and dimension regardless of varying degrees of resilience in the raw stock. The hereinbefore described rod bending machine is capable of making zig-zag web members at a high rate of production, at low cost, and with sufficient accuracy for use in high speed assembly equipment, particularly welders, wherein the surfaces to be welded together must bear a predetermined relation to each other.

We claim:

1. In a machine for bending rods into a plurality of V-shape panels, including opposed first and second guide members, a plurality of movable die carriages mounted on each said guide member, a fixed die carriage centrally positioned on one of said guide members, a work engaging die attached to each said die carriage, the die carriages on one guide member positioned opposite the spaces between the die carriages on the other guide member, the improvement comprising:

(a) gripper dies positioned on one of said guide members for engaging the ends of said rods,
(b) power means for driving one of said guide members toward the other said guide member,
(c) a drive unit adapted to drive said die carriages longitudinally on said guide members,
(d) first automatic means to limit the longitudinal movement of said die carriages, and
(e) second automatic means to permit continued limited movement of one of said guide members after activation of said first automatic means whereby the rods are stretch-bent.

2. Apparatus according to claim 1, further including:
(f) a gear ratio establishing unit in each said die carriage for controlling its speed relative to the other die carriages.

3. Apparatus according to claim 2 further including:
(g) means for selectively activating said die carriages.

4. The method of bending rods into a plurality of V-shape panels to form a continuous zig-zag element for use in the manufacture of structural members which includes the steps of:
feeding said rods into a bending machine;
clamping said rods at the ends thereof;
bending said rods simultaneously at a plurality of points intermediate said clamped ends thereof, at least one of said clamped ends following a longitudinal path toward the other at controlled speed as the bending progresses;
limiting further longitudinal movement of said V-shape panels when the required pitch is attained; and
stretch bending said V-shape panels.

5. The method of bending rods as described in claim 4: wherein a plurality of die carriages are provided which are adapted to move longitudinally at different speeds as the bending cycle progresses, said speed being proportionately greater outwardly from the center of said machine, whereby the distance between the panel points is equal.

References Cited

UNITED STATES PATENTS

| | | | |
|---|---|---|---|
| 1,867,581 | 7/1932 | Marietta | 72—404 |
| 2,485,282 | 10/1949 | Green | 72—297 |
| 2,722,242 | 11/1955 | Talbot | 140—71 |
| 2,815,062 | 12/1957 | Cook et al. | 72—400 |
| 2,995,155 | 8/1961 | Fisher | 140—71 |
| 3,246,500 | 4/1966 | Hansen | 72—297 |

RONALD D. GREFE, *Primary Examiner.*

U.S. Cl. X.R.

72—305, 374, 385, 389, 400; 140—71